(12) United States Patent
Yu

(10) Patent No.: US 11,218,562 B2
(45) Date of Patent: Jan. 4, 2022

(54) METHODS AND APPARATUS FOR COMPUTATION OFFLOADING IN NETWORKED ENVIRONMENTS

(71) Applicant: Intel Corporation, Santa Clara, CA (US)

(72) Inventor: Yifan Yu, Beijing (CN)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 16/336,463

(22) PCT Filed: Sep. 23, 2016

(86) PCT No.: PCT/CN2016/099854
§ 371 (c)(1),
(2) Date: Mar. 25, 2019

(87) PCT Pub. No.: WO2018/053798
PCT Pub. Date: Mar. 29, 2018

(65) Prior Publication Data
US 2020/0036808 A1    Jan. 30, 2020

(51) Int. Cl.
*H04L 29/08*    (2006.01)
(52) U.S. Cl.
CPC .......... *H04L 67/2861* (2013.01); *H04L 67/02* (2013.01)
(58) Field of Classification Search
CPC ............... H04L 67/2861; H04L 67/02
(Continued)

(56) References Cited

U.S. PATENT DOCUMENTS

2001/0037344 A1* 11/2001 Haji ............... G06F 16/972
  715/234
2007/0156845 A1* 7/2007 Devanneaux ........... H04L 67/02
  709/217
(Continued)

FOREIGN PATENT DOCUMENTS

CN      103902373      7/2014
CN      105745585      7/2016
(Continued)

OTHER PUBLICATIONS

LoadFocus, What is HTTP POST Request?, Feb. 27, 2014, Loadfocus.com, https://loadfocus.com/blog/2014/02/what-is-http-post-request/ (Year: 2014).*
(Continued)

*Primary Examiner* — Zi Ye
(74) *Attorney, Agent, or Firm* — Hanley, Flight & Zimmerman, LLC

(57) ABSTRACT

Methods and apparatus for multi-destination wireless transmissions are disclosed. An example method includes detecting, by executing an instruction via a processor, an offload indicator in a web request received from a computing device, the web request triggered by processing of a webpage at the computing device, determining, by executing an instruction via the processor, a function identified in the web request, the function included in the webpage, retrieving, by executing an instruction via the processor, the function from the webpage; and transmitting a result of execution of the function to the computing device in response to the web request.

25 Claims, 7 Drawing Sheets

(58) Field of Classification Search
USPC .......................................................... 709/223
See application file for complete search history.

(56) References Cited

U.S. PATENT DOCUMENTS

| | | | | |
|---|---|---|---|---|
| 2011/0058479 | A1* | 3/2011 | Chowdhury | H04L 45/04 |
| | | | | 370/237 |
| 2011/0282940 | A1 | 11/2011 | Zhang et al. | |
| 2012/0278431 | A1* | 11/2012 | Luna | H04L 41/147 |
| | | | | 709/217 |
| 2012/0322387 | A1 | 12/2012 | Nicoara et al. | |
| 2013/0024496 | A1* | 1/2013 | Krishnan | G06F 9/505 |
| | | | | 709/203 |
| 2013/0121324 | A1* | 5/2013 | Kalmbach | H04L 67/2842 |
| | | | | 370/338 |
| 2014/0344447 | A1 | 2/2014 | Mathena | |

FOREIGN PATENT DOCUMENTS

| | | |
|---|---|---|
| WO | 2016056760 | 4/2016 |
| WO | 2018053798 | 3/2018 |

OTHER PUBLICATIONS

Gavin Carr, URI-Query-0.16, Aug. 9, 2016, metacpan.org, https://metacpan.org/pod/URI::Query (Year: 2016).*

Patent Cooperation Treaty, "International Search Report," issued in connection with International Application No. PCT/CN2016/099854, dated May 2, 2017, 4 pages.

Patent Cooperation Treaty, "Written Opinion of the International Searching Authority," issued in connection with International Application No. PCT/CN2016/099854, dated May 2, 2017, 4 pages.

European Patent Office, "Communication pursuant to Article 94(3) EPC," issued in connection with application No. 16916537.0, dated Jul. 31, 2020, 10 pages.

Huawei et al., "Mobile-Edge Computing," Introductory Technical White Paper, Sep. 2014, 36 pages.

European Patent Office, "Extended European Search Report," issued in connection with application No. 16916537.0, dated Mar. 18, 2020, 10 pages.

Inchul Hwang, "Adaptive Computational Workload Offload Method for Web Applications," Software R&D Center, Samsung Electronics, Samsung-ro 129, Yeongtong-gu, Suwon-si, Gyunggi-do, South Korea, 2015, 13 pages.

Zbierski et al., "Bring the Cloud to Your Mobile: Transparent Offloading of HTML5 Web Workers," Samsung R&D Institute Poland, 2014 IEEE 6th International Conference on Cloud Computing Technology and Science, 6 pages.

European Patent Office, "Communication pursuant to Article 71(3) EPC," issued in connection with application No. 16916537.0, dated Dec. 8, 2020, 45 pages.

China National Intellectual Property Administration, "Notice of First Office Action," issued in connection with CN Application No. 201680088696.5, dated May 31, 2021, 9 pages.

* cited by examiner

METHODS AND APPARATUS FOR COMPUTATION OFFLOADING IN NETWORKED ENVIRONMENTS

RELATED APPLICATIONS

This patent arises from a § 371 National Stage of PCT Application No. PCT/CN2016/099854, filed Sep. 23, 2016. PCT Application No. PCT/CN2016/099854 is hereby incorporated by reference in its entirety.

TECHNICAL FIELD

This disclosure relates generally to computing devices in networked environments, and, more particularly, methods and apparatus for computation offloading in networked environments.

BACKGROUND

Computation offloading is the shifting of a computing task from one device to another. Computation offloading may be utilized, for example, in environments that include computing devices with limited computing resources communicatively coupled with more powerful computing devices. For example, a mobile computing device may offload performance of a complex function to a server that includes more powerful computing resources.

Computation offloading may be utilized, for example, in environments that include a mobile edge computing server. Mobile edge computing is a network architecture in which computing resources (e.g., cloud computing servers) are located at the edge (e.g., in or near a cellular base station) of a wireless network (e.g., a cellular network). By moving the computing resources to edge of the wireless network, latency and bandwidth issues are reduced when compared with traditional centralized networking architectures.

DETAILED DESCRIPTION

Typical computation offloading architectures utilize dedicated toolkits and runtime environments to coordinate the cooperation of the computing device and the offloading server. Such toolkits and runtime environments may not be supported by all devices and add computation overhead and installation complexity.

Example methods and apparatus disclosed herein facilitate computing offloading on a wide array of computing devices with little or no configuration of the computing devices. For example, executable instructions to cause a computing device to perform computing offloading may be distributed in a web format (e.g., hypertext markup language 5 (HTML5)) that is natively supported by many computing devices. In some examples, the executable instructions cause computing devices to dynamically decide if and/or when computation offloading will be utilized. Such dynamic decision handling enables the computing devices to decide when computation offloading will be advantageous (e.g., when an offloading server will be able to perform a function faster than the computing device even when network communication latency is taken into account).

Figure 1:
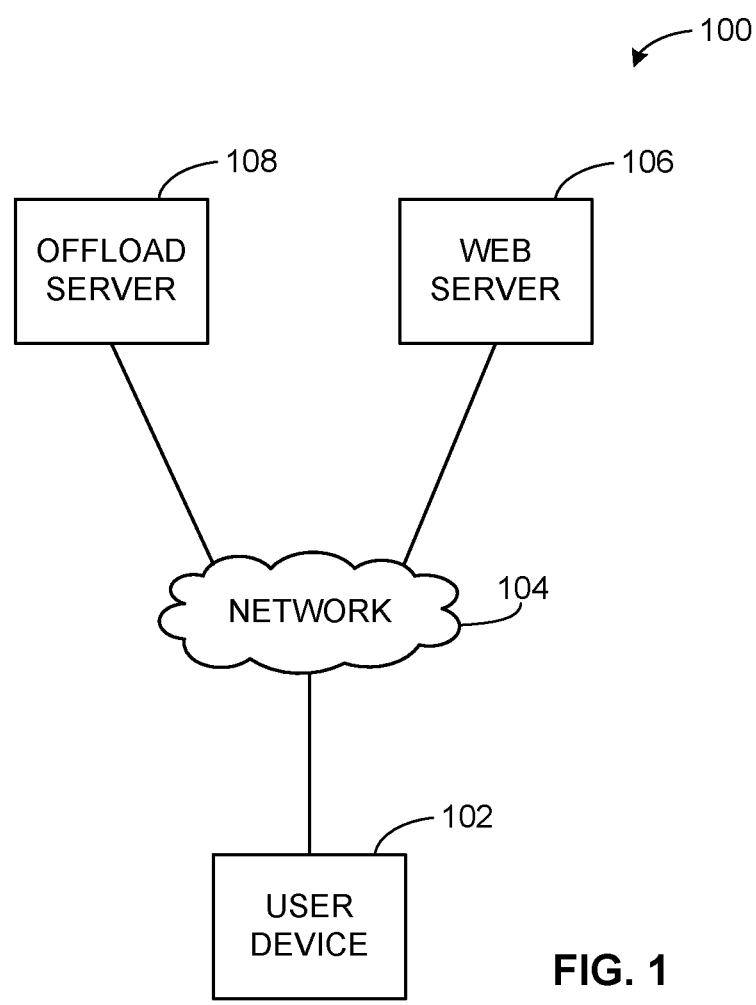
FIG. 1 is a block diagram of an example environment in which an example offload server performs computation offloading for an example user device.

FIG. 1 is a block diagram of an example environment 100 in which an example user device 102 communicates via an example network 104 with an example web server 106 and an example offload server 108.

The example user device 102 is a mobile computing device such as a smartphone. Alternatively, the user device 102 may be any type of computing device such as, for example, a tablet, a laptop, a desktop computer, a server, an Internet of Things device, a microcontroller, etc.

The example user device 102 includes the capabilities for communicating via the example network 104 with the example web server 106 to request, retrieve, and present webpages at the user device 102. For example, the user device 102 of FIG. 1 includes a web browser capable of rendering webpages and executing executable instructions (e.g., scripts such as JavaScript) contained within and/or otherwise associated with the webpages.

While a single example user device 102 is illustrated in FIG. 1, the environment 100 may, alternatively, include any number of user devices 102.

The example network 104 communicatively couples the example user device 102 with the example web server 106 and the example offload server 108. The network 104 of the illustrated example is the internet. Additionally or alternatively, the network 104 may include any number and/or type of network (e.g., a wide area network, a local area network, a wireless network, a wired network, a cellular network, public network, private network, etc.).

The example web server 106 is a hypertext transfer protocol (HTTP)-based webpage server. The example web server 106 serves webpages to the example user device 102 for presentation on the example user device 102. According to the illustrated example, some of the webpages served by the example web server 106 include executable instructions (e.g., JavaScript instructions that may be included in the webpage and/or associated with the webpage by a link(s) in the webpage). For example, the example executable instructions, when executed at the user device 102 in response to retrieving the webpage, may retrieve a set of data from the user device 102 and perform a complex calculation using the data.

According to the illustrated example, the executable instructions included in webpages served by the example web server 106 also include instructions that, when executed, cause the example user device 102 to determine when to perform computation offloading to the example offload server 108. For example, the instructions, when executed at the user device, may determine characteristics of the example user device 102, characteristics of the communication between the example user device 102 and the example offload server, or any other characteristics that may be utilized in determining whether computation offloading will be utilized.

The example offload server 108 receives requests for computation offloading from the example user device 102. According to the illustrated example, the requests are received at the offload server 108 by intercepting web requests transmitted to the example web server 106. According to the illustrated example, web requests for offloading are transmitted with a destination identifying the example web server 106, but include a parameter identifying the requests as offloading requests. For example, according to the illustrated example, the web requests include a uniform resource indicator (URI) QUERY parameter indicating offloading. For example, the web requests include a Request-URI:

http://www.sampleserver.com/content/webpage.htm?Offload_Function=<Function Tag>

Example 1

***Unbalanced parens in the next paragraph
where Offload_Function indicates that the request is a computation offloading request and <Function Tag> is replaced by a tag identifying a function to be executed). Thus, the example offload server 108 may monitor the network for requests that include a computation offloading parameter and intercept the requests for processing by the offload server 108. The requests may be prevented from further reaching the example web server 106, may reach the example web server 106 but be ignored by the example web server 106, etc.

Alternatively, the example offload server 108 may receive computation offloading requests via the example network 104 in any other manner. For example, the computation offloading requests may be sent to the example web server 106 and may be redirected to the example offload server 108, the example user device 102 may transmit the computation offloading requests directly to the example offload server 108, etc.

The example offload server 108 determines the identity and location of the webpage associated with the function for which computation offloading was requested. According to the illustrated example, the identity and location of the webpage are determined from the intercepted computing offloading request. For example, according to Example 1, the webpage is the file webpage.htm located in the directory content on a server at the domain sampleserver.com. Alternatively, the offload server 108 may determine the identity and/or the location of the webpage in any other manner (e.g., from a parameter of the computation offloading request, by sending a query to the example user device 102, from a log of webpages requested by the example user device 102, etc.). Additionally or alternatively, the offload server 108 may determine that the function is included in a file other than a webpage (e.g., a script file, a code file, a JavaScript file, etc.).

The example offload server 108 retrieves the function identified by the computation offloading request. For example, when the function is associated with a webpage, the example offload server 108 retrieves the webpage (e.g., from a storage of the offload server 108 when the offload server 108 serves the webpage, from the web server 106 when the web server 106 serves the webpage, etc.) and extracts the function from the webpage.

According to the illustrated example, the offload server 108 receives data for executing the offloaded function from the example user device 102 (e.g., data included in the computation offloading request, associated with the computation offloading request, etc.). For example, the computation offloading request may be transmitted as an HTTP POST message that includes data stored in a JavaScript Object Notation (JSON) data structure. For example, the JSON data structure may be formatted as

```
{
    { "value name": xxx}
    "object name": [
    { "value name": xxx},
    ]
}
```

Example 2 where object name denotes the data structure defined in the offloaded function (e.g., the same name as that in the original webpage) and value name denotes the variable defined in the offloaded function (e.g., the same name as that in the original webpage). Data may additionally or alternatively be received in another format (e.g., digital object data may be transmitted as raw data after the computation offloading request, data may be inserted as a parameter of the computation offloading request (e.g., inserted in the URI QUERY of the computation offloading request), data retrieved from an external source by the example offload server 108, etc.).

The example offload server 108 executes the retrieved function using the received data and transmits the results back to the example user device 102. The example offload server 108 transmits the results of the function execution to the example user device 102 in a JSON object in an HTTP response to the computation offloading request. The JSON object may be structured as:

```
{
    { "value name": xxx}
    "object name": [
    { "value name": xxx},
    ]
}
``` where object name denotes the data structure defined in the returned results. For example, object name may have the same name as in the original webpage. Value name denotes the variable defined in the returned results. For example, value name may have the same name as the variable in the original webpage. Data may additionally or alternatively be transmitted in another format (e.g., digital object data may be transmitted as raw data in the HTTP response, data may be inserted as a parameter of the computation offloading request (e.g., inserted in the URI QUERY of the HTTP response), etc.).

Figure 2:
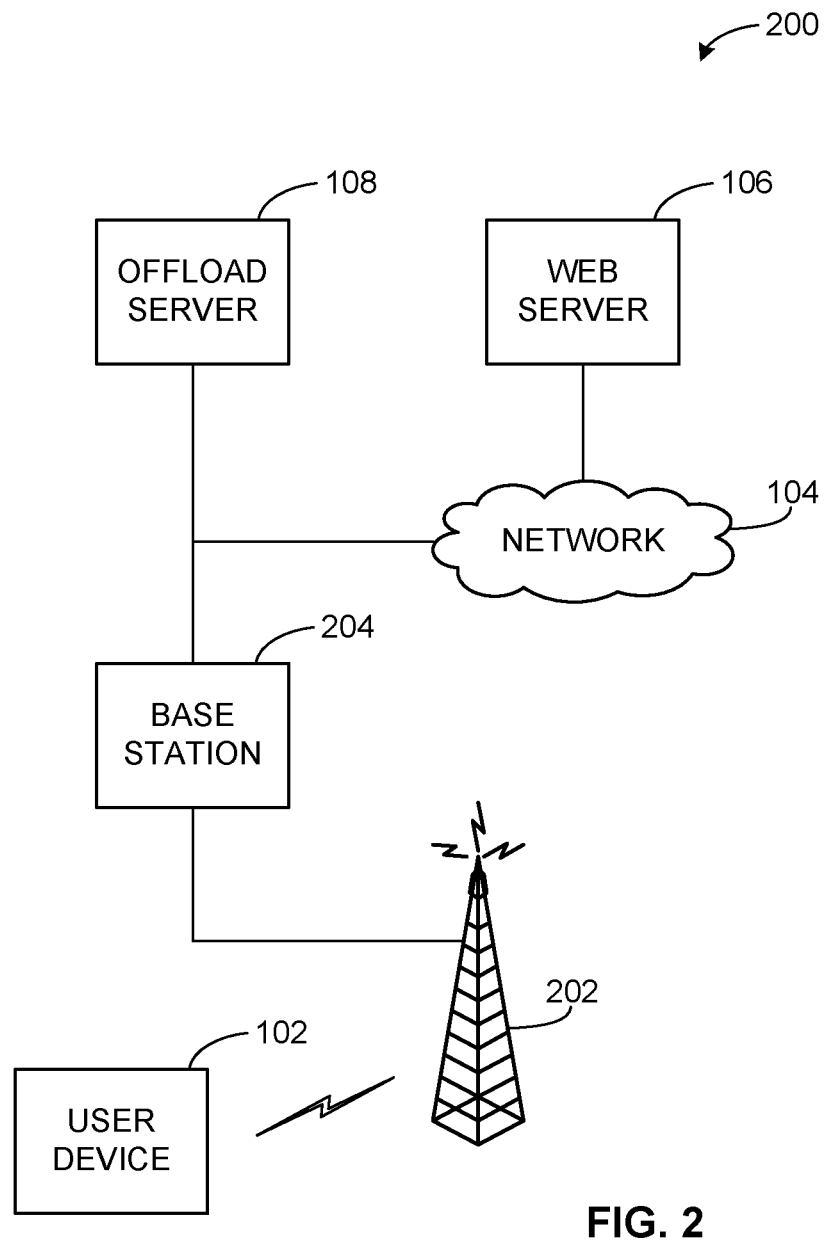
FIG. 2 is a block diagram of another example environment in which an example offload server performs computation offloading for an example user device.

FIG. 2 is a block diagram of another example environment 200 in which the example offload server 108 performs computation offloading for the example user device 102. According to the illustrated example of FIG. 2, the example user device 102 is communicatively coupled to the example network 104 and the example offload server 108 via an example cellular tower 202 and an example base station 204. The offload server 108 of the illustrated example is a mobile edge computing (MEC) server. Thus, communications between the example user device 102 and the example offload server 108 do not pass through the example network 104 while communications between the example web server 106 and either or both of the example user device 102 and/or the example offload server 108 pass through the example network 104. As used herein, a MEC server is a server that is deployed in a network operated by a network access provider to provide network access to a user device. As used herein, communications from the user device to the MEC can be transmitted to the MEC server without passing through the a public communications network (e.g., the internet).

The example cellular tower 202 and the example base station 204 form and/or are a part of a cellular communications network to facilitate wirelessly communication with the example user device 102. The example cellular tower 202 and the example base station 204 may, alternatively, be implemented using any type of wireless communication architecture. For example, the cellular tower 202 and the base station 204 could be implemented by a wireless fidelity (wifi) access point that includes a local area network that includes the example offload server 108 so that the example offload server 108 is closer to the edge of communication with the example user device 102 than the example web server 106. In some examples, the offload server 108 may be located near the edge of a network that does not wirelessly communicate with the example user device 102. For example, the offload server 108 may retain the low latency advantages of being located near the edge of a network that includes wired communication with the example user device 102.

In operation of the example environment 100 of FIG. 1 and/or the example environment 200 of FIG. 2, the example user device 102 retrieves a webpage from the example web server 106. The example webpage includes instructions to perform a function (e.g., to perform a complex calculation). The instructions additionally instruct the example user device 102 to determine if computation offloading is to be performed. For example, the instructions may instruct the example user device 102 to determine a network latency to the example offload server 108 (e.g., by sending a ping request), to estimate a time required to execute the example function at the example user device 102, to estimate a time required to execute the example function at the example offload server 108, and/or any other factor that may be utilized in determined if computation offloading is to be performed. When the example user device 102 determines that computation offloading is to be performed, the example user device 102 transmits a computation offloading request to the example web server 106 (e.g., sends a request for the webpage (e.g., similar to the request that was initially sent to retrieve the webpage)) and includes URI QUERY parameter indicating computation offloading is requested and identifying the function to be offloaded. The example offload server 108 intercepts the example computation offloading request directed to the example web server 106 (e.g., by snooping communications sent in the example network 104, by snooping communications at the example base station 204, etc.). The example offload server 108 determines the webpage and function for which offloading is requested, retrieves the webpage from the example web server 106, and extracts the function from the webpage. The example offload server 108 determines input data for the function that is included in and/or associated with the computation offloading request and executes the function using the input data. The example offload server 108 transmits the result of the function execution to the example user device 102. The example user device 102 continues processes the instructions of the webpage using the result of the execution of the function. Thus, the function execution is dynamically offloaded to the example offload server 108 and the user device 102 does not need to execute the function. Alternatively, when the example user device 102 evaluates the instructions and determines that the function is to be executed at the user device (e.g., because the latency of communication with the offload server 108 will exceed the time savings of executing the function at the offload server 108, because the offload server is unavailable, because the user device 102 includes all of the capabilities required for executing the function, etc.), the user device 102 does not send a computation offloading request and, instead, executes the function at the user device 102.

While FIG. 1 and FIG. 2 illustrate environments in which the example web server 106 and the example offload server 108 are implemented as separate device, the functionality of the example web server 106 and the example offload server 108 may be integrated into a single device (e.g., may be integrated into the example web server 106 and/or integrated into the example offload server 108). For example, the offload server 108 may serve webpage as well as execute offload requests received from the example user device 102 for functions in the webpages served by the example offload server 108. Additionally or alternatively, the web server 106 may be implemented as a MEC server or other type of server that is located within a network provider's network near the user device 102.

Figure 3:
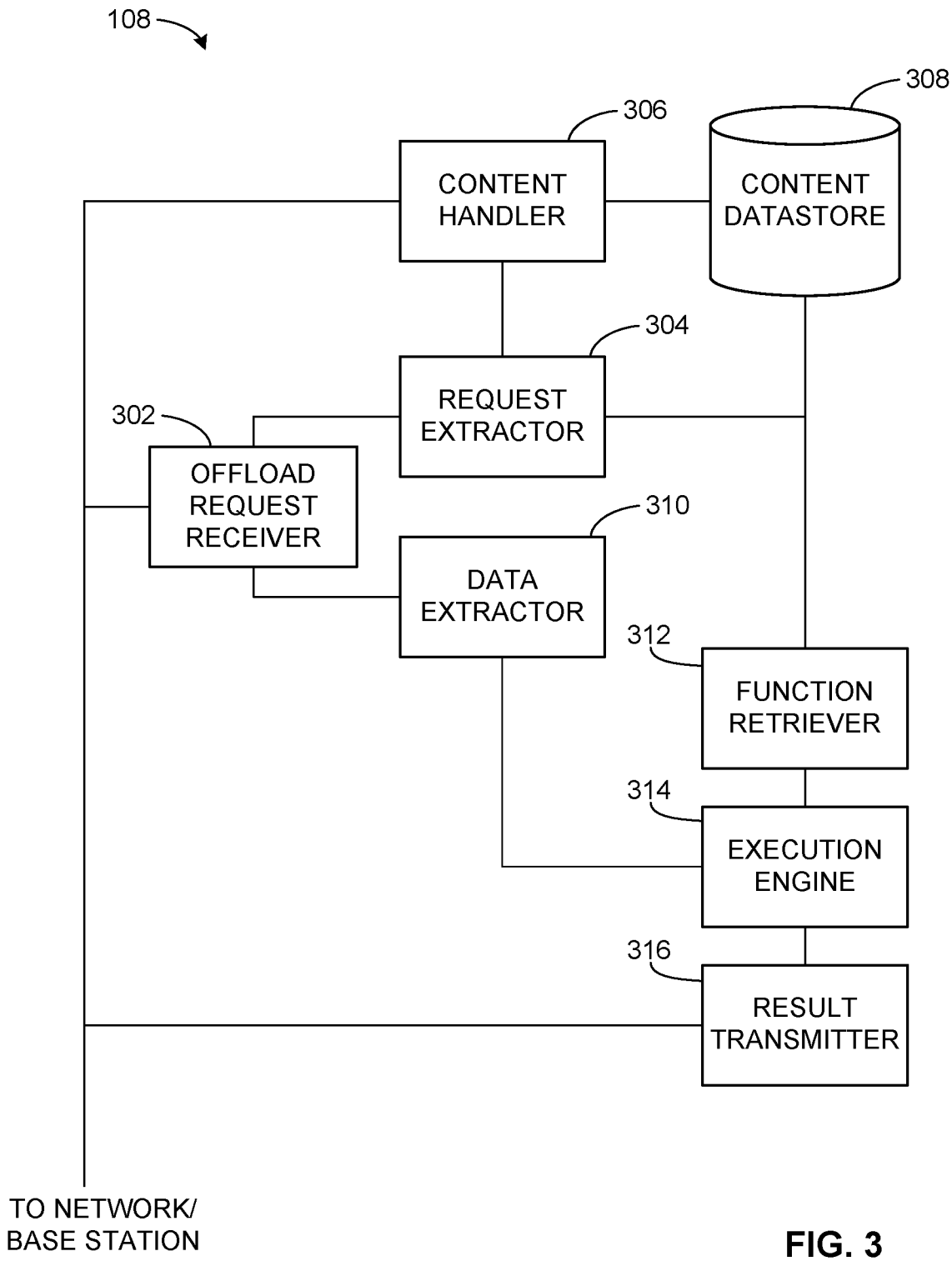
FIG. 3 is a block diagram of an example implementation of the example offload server of FIG. 1.

FIG. 3 is a block diagram of an example implementation of the example offload server 108 of FIG. 1. The example offload server 108 of FIG. 3 includes an example offload request receiver 302, an example request extractor 304, an example content handler 306, an example content datastore 308, an example data extractor 310, an example function retriever 312, an example execution engine 314, and an example result transmitter 316.

The example offload request receiver 302 receives computation offloading requests from the example user device 102. According to the illustrated example, the offload request receiver 302 receives HTTP computation offloading by intercepting requests directed to a web server (e.g., the example web server 106 of FIG. 1 and/or FIG. 2). Alternatively, the user device 102 may transmit the requests to the example offload request receiver 302, the example web server 106 may redirect requests to the example offload request receiver 302, or the computation offloading requests may be received at the offload request receiver 302 in any other manner.

The example request extractor 304 analyzes computation offloading requests received by the example offload request receiver 302 to determine a function requested for offloading and a webpage including the function. The example request extractor 304 determines the webpage from a URI portion of an HTTP computation offloading request. The example request extractor 304 determines a function requested by offloading from a parameter in the URI QUERY of the HTTP computation offloading request. Alternatively, the webpage and the function may be determined in any other manner (e.g., from parameters included in the computation offloading request, from a link to a webpage and/or function, from a function embedded in the computation offloading request, etc.). The example request extractor 304 transmits an identification and/or path to the webpage to the example content handler 306 and transmits the identity of the function to the example function retriever 312.

The example content handler 306 retrieves the webpage identified by the example request extractor 304. According to the illustrated example, the content handler 306 retrieves the webpage from the example web server 106 in the same manner in which the example user device 102 previously requested the webpage (e.g., by transmitting an HTTP request for the webpage). The example content handler 306 stores the webpage in the example content datastore 308. Alternatively, in implementations in which the content handler 306 maintains storage of webpages (e.g., caches webpages, permanently stores webpages, etc.) and/or when the example offload server 108 operates to serve webpages, the example content handler 306 may first query the content datastore 308 to determine if the content datastore 308 already has a copy of the webpage and/or if the age of the copy does not exceed a threshold. The content handler 306 may, alternatively, retrieve the webpage from any other location (e.g., from a local storage at the example offload server 108, from a remote storage location, from the user device 102, from the computation offloading request, etc.).

The example content datastore 308 is a temporary file storage for storing webpages retrieved by the example content handler 306 for offload function processing. The example content datastore 308 maintains storage of the retrieved webpages until the function requested for offloading from the webpage has been executed. Alternatively, the content datastore 308 may be any other type of storage (e.g., long term storage for webpages, a webpage storage cache, a database, a hard drive, a file, etc.). In some implementations, the example content datastore 308 may not be included in the example offload server 108 and, instead, the content handler 306 will transmit retrieved webpages directly to the example function retriever.

The example data extractor 310 receives and/or extracts input data sent by the example user device 102 (or otherwise provided to the example offload request receiver 302). For example, the input data may be provided as JSON data, raw data, text data, binary data, etc. The input data may be extracted from the example computation offloading request, may be received in junction with the example computation offloading request, etc. The example data extractor 310 transmits the input data to the example execution engine 314 for use in executing the function identified in the computation offloading request.

The example function retriever 312 receives an identification of a function from the example request extractor 304 and retrieves the identified function from the webpage stored in the example content datastore 308. For example, the function retriever 312 may parse the webpage to locate the function identified by the example request extractor 304 and may extract the function from the webpage for execution. The example function retriever 312 provides the extracted function to the example execution engine 314.

The example execution engine 314 receives the function from the example function retriever 312 and executes the function using the input data from the example data extractor 310. The example execution engine 314 is a JavaScript execution engine. Alternatively, the execution engine 314 may be any number and/or type of execution engine. For example, the execution engine 314 may be comprised of a first execution engine of a first type and a second execution engine of a second type. The example execution engine 314 provides the output of the execution to the example result transmitter 316.

The example result transmitter 316 receives the result of the execution of the offloaded function from the execution engine and transmits the result to the example user device 102. For example, in the example environment 100 of FIG. 1, the result transmitter 316 transmits the result via the example network 104. Alternatively, in the example environment 200 of FIG. 2, the result transmitter 316 transmits the result via the example base station 204 and the example cellular tower 202. According to the illustrated example, the result transmitter generates an HTTP response for transmitting the result as a response to the computation offloading request. Alternatively, the result may be transmitted as any number and/or type of message.

While an example manner of implementing the example offload server 108 of FIG. 1 and/or FIG. 2 is illustrated in FIG. 3, one or more of the elements, processes and/or devices illustrated in FIG. 3 may be combined, divided, re-arranged, omitted, eliminated and/or implemented in any other way. Further, the example offload request receiver 302, the example request extractor 304, the example content handler 306, the example data extractor 310, the example function retriever 312, the example execution engine 314, the example result transmitter 316 and/or, more generally, the example offload server 108 of FIG. 3 may be implemented by hardware, software, firmware and/or any combination of hardware, software and/or firmware. Thus, for example, any of the example offload request receiver 302, the example request extractor 304, the example content handler 306, the example data extractor 310, the example function retriever 312, the example execution engine 314, the example result transmitter 316 and/or, more generally, the example offload server 108 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example offload request receiver 302, the example request extractor 304, the example content handler 306, the example data extractor 310, the example function retriever 312, the example execution engine 314, the example result transmitter 316 and/or, more generally, the example offload server 108 of FIG. 3 is/are hereby expressly defined to include a tangible computer readable storage device or storage disk such as a memory, a digital versatile disk (DVD), a compact disk (CD), a Blu-ray disk, etc. storing the software and/or firmware. Further still, the example offload server 108 may include one or more elements, processes and/or devices in addition to, or instead of, those illustrated in FIG. 3, and/or may include more than one of any or all of the illustrated elements, processes and devices.

Figure 4:
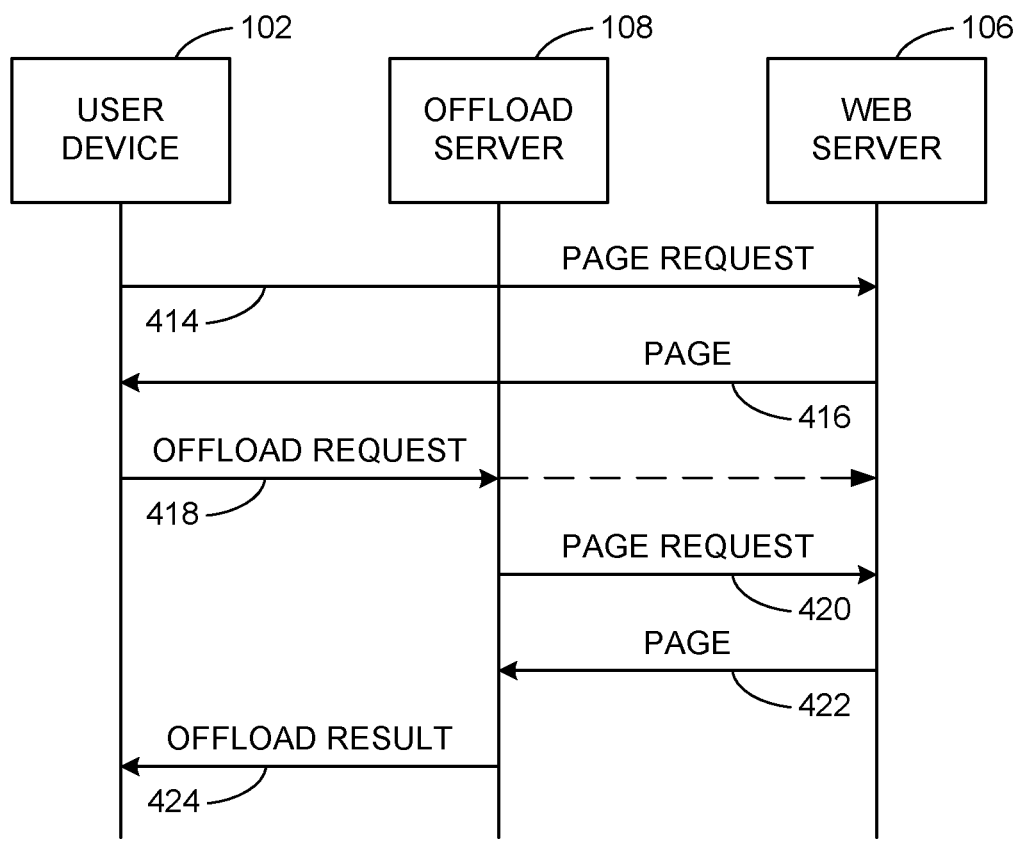
FIG. 4 is an example message diagram illustrating an example intercommunication among the example user device, the example web server, and the example offload server.

FIG. 4 is an example message diagram illustrating an example intercommunication among the example user device 102, the example web server 106, and the example offload server 108.

According to the illustrated example, the example user device 102 transmits a page request 414 for a webpage to the example web server 106. The example page request may be an HTTP request included a URI for the webpage. The example web server 106 transmits a page response 416 to the user device 102 in response to the request 414. For example, the page response 416 may be transmitted as an HTTP response.

The example user device 102 begins to process the webpage. According to the illustrated example, the webpage includes (or links to) instructions for a function and instructions that cause the user device 102 to determine if offloading is to be performed. The example user device 102 executes the instructions and evaluates whether offloading is to be performed. When offloading is to be performed, the example user device 102 transmits an offload request 418 directed to the example web server 106. The example offload request receiver 302 of the example offload server 108 intercepts the example offload request 418. According to the illustrated example, the offload request 418 does not reach the example web server 106 as illustrated by the dashed line in FIG. 4.

Upon receiving the offload request 418, the request extractor 304 extracts the identity (e.g., file name) and location (e.g., domain name and path) for the webpage and the example content handler 306 transmits a page request 420 to request the webpage. For example, the page request 420 may be similar to or identical to the example page request 414 transmitted by the user device 102. The example web server 106 responds to the page request 420 by transmitting a page response 422 to the content handler 306 of the example offload server 108, which stores the page in the example content datastore 308. According to the illustrated example, the webpage included in the page response 422 is the same as the webpage included in the page response 416 and the same as the webpage that caused the example user device to transmit the offload request 418.

The example function retriever 312 of the example offload server 108 extracts the function for offloading from the example page response 422 and the example execution engine 314 executes the function using input data sent by the user device 102 with the offload request 418 and retrieved by the example data extractor 310. The example result transmitter 316 then transmits an offload result 424 to the example user device 102.

Figure 5:
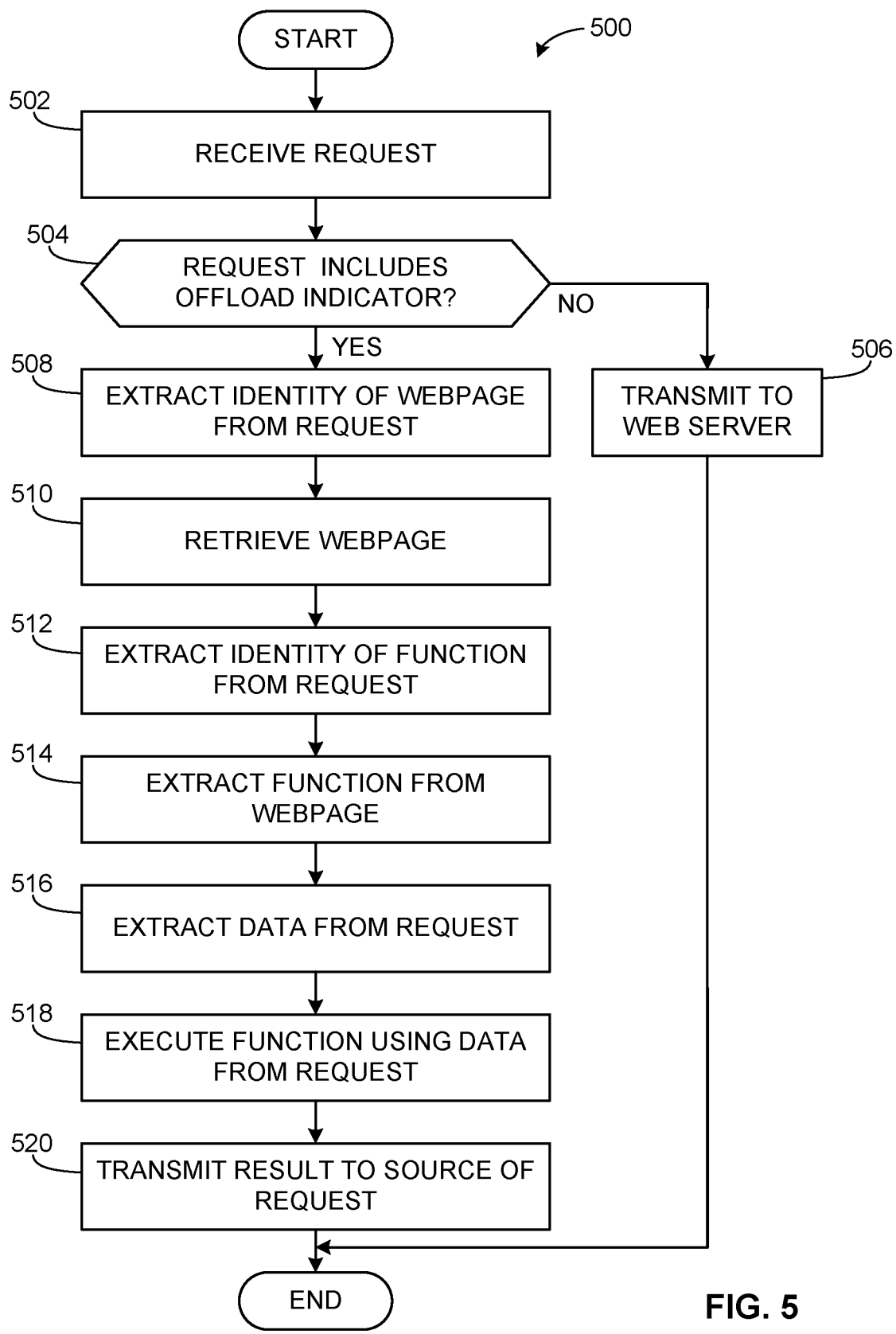
FIG. 5 is a flow diagram representative of example machine readable instructions that may be executed to implement the example offload server of FIG. 1, FIG. 2, and/or FIG. 3.

A flowchart representative of example machine readable instructions for implementing the example offload server 108 of FIG. 1, FIG. 2, FIG. 3, and/or FIG. 4 is shown in FIG. 5. In this example, the machine readable instructions comprise a program for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 5, many other methods of implementing the example offload server 108 may alternatively be used. For example, the order of execution of the blocks may be changed, and/or some of the blocks described may be changed, eliminated, or combined.

As mentioned above, the example processes of FIG. 5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example process 500 of FIG. 5 begins when the example offload request receiver 302 receives a web request (block 502). According to the illustrated example, the web request is intercepted when the example user device 102 of FIG. 1 transmits the request addressed to the example web server 106. The example offload request receiver 302 determines if the web request includes an offload indicator (also may be referred to as an offloading indicator) (block 504). For example, the request may include a parameter in a URI QUERY portion of the URI of the web request that identifies the request as a request to offload execution of a particular function. When the request does not include the offload indicator, the example offload request receiver 302 transmits the request to the example web server 106 so that the web server 106 may serve the request (block 506). The process of FIG. 5 then ends. Alternatively, the example offload request receiver may snoop or monitor requests transmitted from the example user device 102 to example web server 106 and may only intervene to intercept the requests when a request includes the offload indicator.

According to the illustrated example, when the request includes the offload indicator (block 504), the example request extractor 304 extracts the identity of the webpage that includes the function identified in the computation offloading request (block 508). For example, when the computation offloading request is a request for a particular webpage at the web server 106 and the offload request receiver 302 intercepts the request because the request includes an offload indicator, the example request extractor 304 determines the identity of the webpage to be the webpage identified in the URI of the request.

The example content handler 306 retrieves the webpage identified by the request extractor 304 and stores the webpage in the example content datastore 308 (block 510).

The example request extractor 304 determines the identity of the function for which offloading is requested (block 512). For example, the example offload indicator identifies a function for which offloading is requested. The example function retriever 312 extracts the function from the webpage (block 514). The example data extractor 310 extracts input data from the intercepted request (block 516). For example, the input data may be JSON data, raw data, etc. transmitted in and/or with the request.

The example execution engine 314 executes the function extracted by the example function retriever 312 using the data extracted by the example data extractor 310 (block 518). The example result transmitter transmits a result of the execution to the source of the request (e.g., to the example user device 102) (block 520). The process of FIG. 5 then ends.

Figure 6:
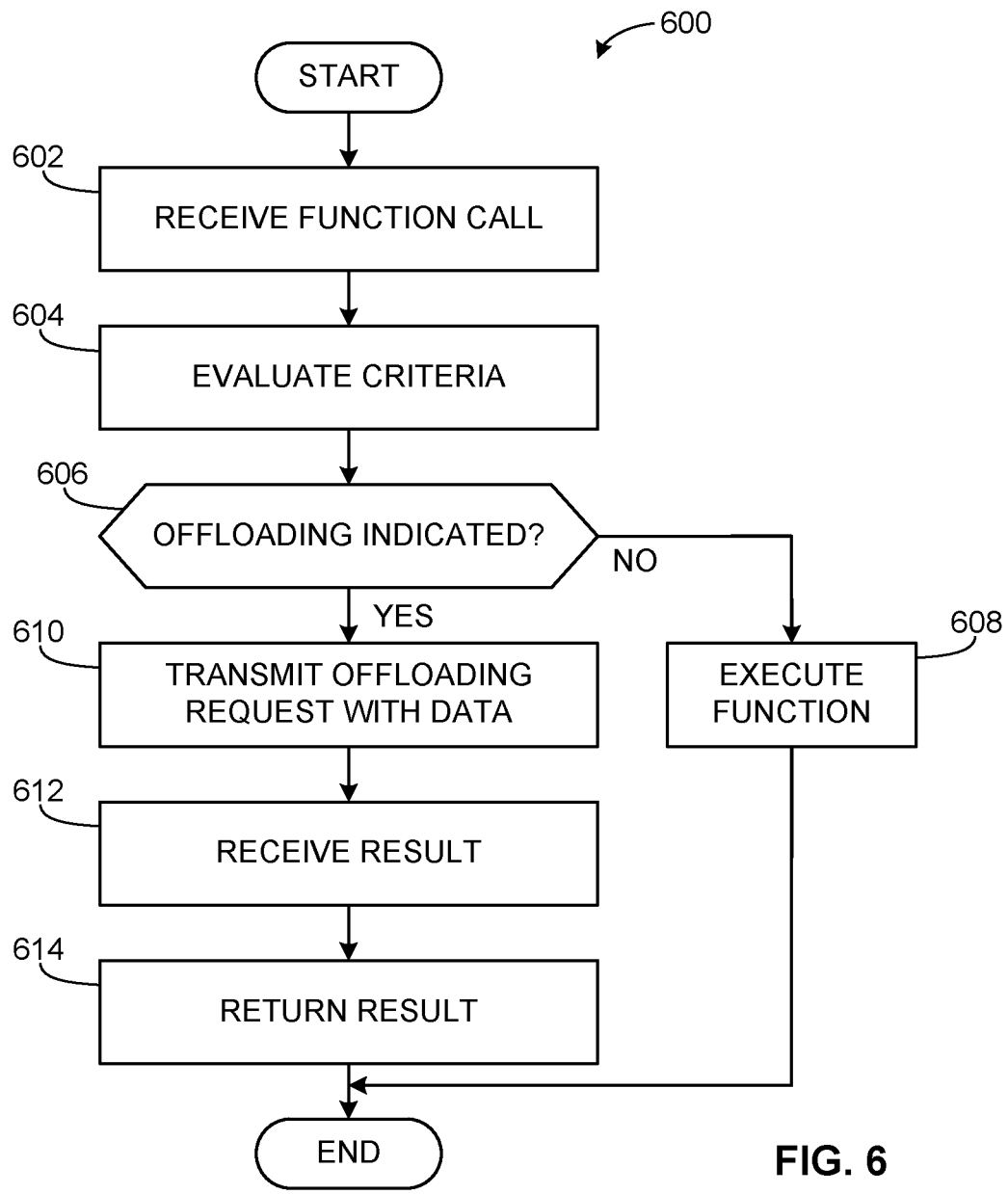
FIG. 6 is a flow diagram representative of example machine readable instructions that may implement

FIG. 6 is a flowchart illustrating example instructions 600 that may be included in a webpage for execution by the example user device 102 while processing a webpage served by the example web server 106 and/or by the example offload server 108.

The example instructions 600 of FIG. 6 are executed when the example user device 102 has received a webpage from the example web server 106 and/or the example offload server 108 and a call is made to a function that has been instrumented with offloading capabilities. Thus, the instructions begin executing when a function call is received (block 602).

The instructions execution then evaluates criteria for determining if offloading of the function is to be performed (block 604). The criteria may be criteria about the example user device 102 that is executing the instructions, criteria about the network 104, criteria about the cellular tower 202 and/or the base station 204, criteria about the offload server 108 that will perform the offloading, criteria about input data for the function, etc. For example, the criteria may include computational capabilities of the user device 102; whether the user device 102 includes hardware (e.g., a graphics processing unit); whether the user device 102 includes software pre-requisites for executing the function; a data complexity for input data on which the function will operate; a size of the input data; a latency for communication with the network 104, the offload server 106, the cellular tower 202, the base station 204, etc.; a computational capability of the offload server 108, etc.

The execution of the instructions 600 determines if the criteria indicates that offloading is indicated (block 606). For example, the criteria may be compared with a threshold(s) to determine if offloading is indicated. When offloading is not indicated, the example user device 102 continues executing the function (block 608).

When offloading is indicated (block 606), the execution of the instructions transmits an offloading request with input data (block 610). For example, the request may be transmitted as an HTTP POST request with the input data formatted as a JSON structure. According to the illustrated example, the request is transmitted as a request to the example web server 106 requesting the example webpage and including a URI QUERY parameter indicating offloading is requested with an identification of the function.

According to the illustrated example, after the request is transmitted the example offload server 108 intercepts the request and executes the function using the input data. The offload server 108 transmits the result to the user device 102 that is executing the instructions 600.

The execution of the instructions then receives the result of the offloaded execution (block 612). The function then returns the result of the execution (block 614). For example, the result may be utilized in further performance of the function, may be presented to a user of the user device 102, may be transmitted from the user device 102, may be provided to another function, etc.

An example set of instructions that may be included in the webpage for initiating computation offloading at the user device 102 using the HTML5 Web Worker functionality is:

```
Computation_Offloader(url,func){
    if(typeof(Worker)!=="undefined"){
```

-continued

```
        if(typeof(w)=="undefined"){
            w=newWorker("url?Offload_Function=
func");
            w.postMessage(InputData);
        }
    };
}
```

Example 3 where Computation_Offloader(url,func) invokes the remote execution of the function whose name is func. The url denotes the original html file with the offloaded function. new Worker("url?Offload_Function=func") invokes the Web Worker which launches that func should be remotely executed in the offload server 108. The input data for the function execution is uploaded by calling w.postMessage (InputData). The HTTP session setup with the offload server 108 and url?Offload_Function=func represents that func should be remotely executed in the offload server 108. The input data for the function execution is uploaded by calling w.postMessage(InputData).

An example implementation of a webpage with HTML5 for implementing offloading is:

```
<!DOCTYPE html>
<html>
<body>
<p>Input number:<input
type="text"name="inv"/></p>
<p>Result<output id="result"></output></p>
<button
onclick="mul_t(inv.value)">Computing</button
>
<br/><br/>
<SCRIPT LANGUAGE="JavaScript">
function mul_t(inv){
    if(parseInt(inv.value)>10000){
        w=Computation_Offloader(mul);
        if(typeof(w)!=="undefined"){
            w.onmessage=function(event
){
                document.getElementById
                ("result").innerHTML=event.
                data.num;
            };
        }
    }
    else{
        mul(inv);
    }
}
function mul(inv){
    var i;
    var num=1;
    for(i=1;i<=parseInt(inv);i++){
        num=num*i;
    }
    document.all.result.value=num;
}
</SCRIPT>
</body>
</html>
```

According to this example, the user device 102 fetches the original html file from the webpage server 106. As the button "Computing" is clicked, the function mul_t( ) is called. If the input number inv is larger than 10000, the user device 102 will initiate the computation offloading of the function mul( ) in the offload server 108. Otherwise, the user device 108 conducts the local execution of the function mul( )

Given the activation of computation offloading, the returned results denoted as event.data.num are displayed at the user device 102.

Figure 7:
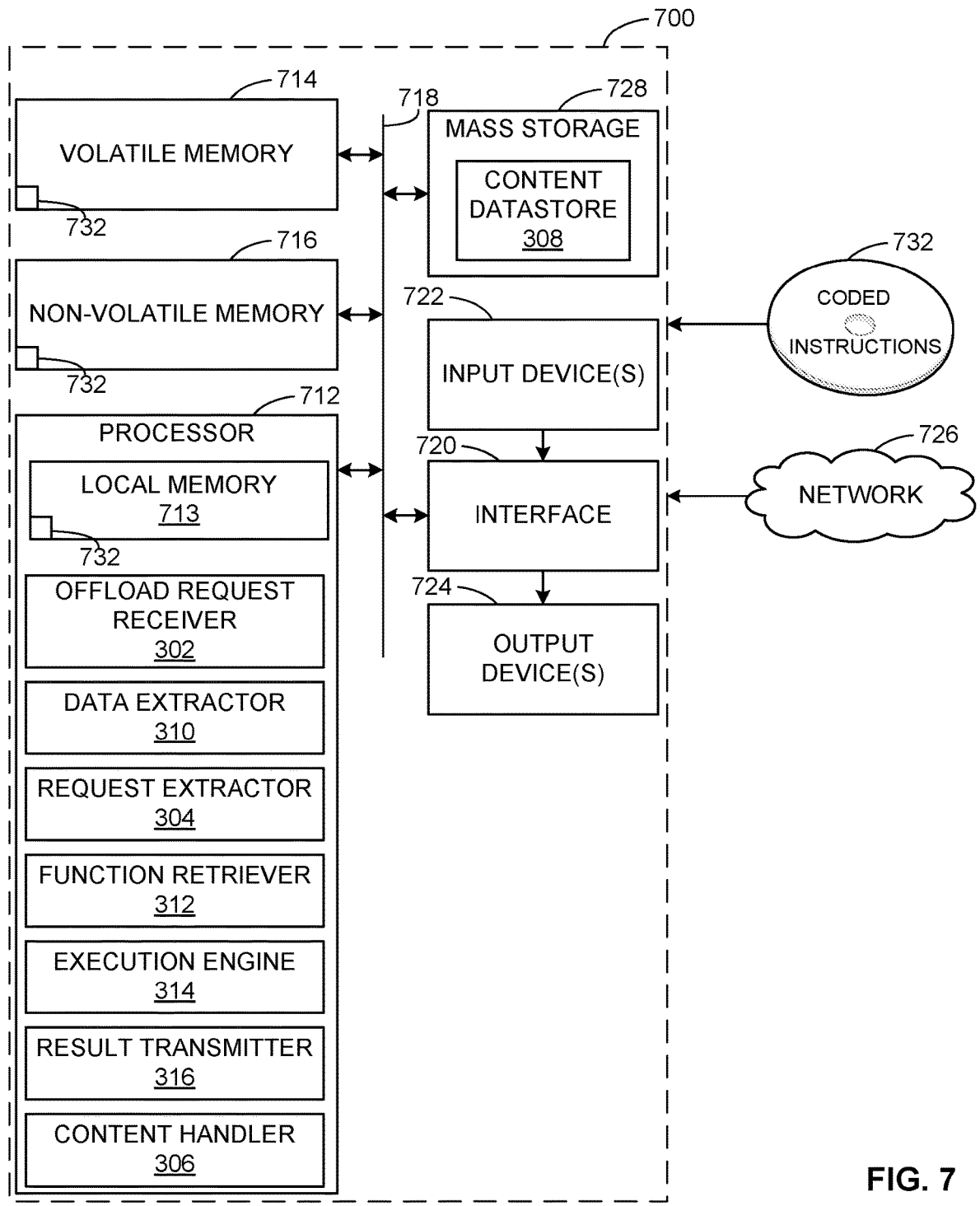
FIG. 7 is a block diagram of an example processor system structured to execute the example machine readable instructions represented by FIG. 6 to implement the example offload server of FIG. 1, FIG. 2, and/or FIG. 3.

FIG. 7 is a block diagram of an example processor platform 700 capable of executing the instructions of FIG. 5 to implement the example offload server 108 of FIG. 1, FIG. 2, and/or FIG. 3. The processor platform 700 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). The example processor 712 includes the example offload request receiver 302, the example request extractor 304, the example content handler 306, the example data extractor 310, the example function retriever 312, the example execution engine 314, and the example result transmitter 316. The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives. The example mass storage devices 728 store the example content datastore 308.

The coded instructions 732 of FIG. 5 may be stored in the mass storage device 728, in the volatile memory 714, in the non-volatile memory 716, and/or on a removable tangible computer readable storage medium such as a CD or DVD.

From the foregoing, it will be appreciated that the above disclosed methods, apparatus, and articles of manufacture facilitate the offloading of computations from a user device to a network device (e.g., offloading from a user device with computing resources that are, in some way, less powerful than the computing resources of the network device (e.g., a server)). In some examples, computing resource utilization of the user device is further reduced from existing computation offloading solutions by utilizing web requests to signal requests for computation offloading to a server. For example, the web requests may utilize protocols and environments that are natively installed on the user device and/or installed for common usage of the user device (e.g., installed with a web browser). Accordingly, some examples eliminate the need for installing a client application for managing the computation offloading, which may reduce memory utilization and processor utilization of the user device. In some examples, the computing resources of the server servicing the offloading request are reduced by retrieving the function for offloading on demand (e.g., rather than storing all functions that may be requested for computation offloading). Furthermore, because functions are retrieved on demand, an offload server may service offloading requests for functions associated with a variety of different hosts (e.g., a variety of webpage servers hosted by different entities).

Example methods, apparatus, systems and articles of manufacture to offload computations in a computer networked environment are disclosed herein. Further examples and combinations thereof include the following.

Example 1 is a method to offload computations in a networked environment, the method including detecting, by executing an instruction via a processor, an offload indicator in a web request received from a computing device, the web request triggered by processing of a webpage at the computing device, determining, by executing an instruction via the processor, a function identified in the web request, the function included in the webpage, retrieving, by executing an instruction via the processor, the function from the webpage, and transmitting a result of execution of the function to the computing device in response to the web request.

Example 2 includes the method as defined in example 1, wherein the processor is included in a mobile edge computing server.

Example 3 includes the method as defined in example 1, wherein the web request identifies the webpage.

Example 4 includes the method of example 1, wherein retrieving the function includes retrieving the function from a storage of a web server that includes the processor.

Example 5 includes the method of example 1, wherein retrieving the function includes retrieving the function via a network from a first web server that is separate from a second web server that includes the processor.

Example 6 includes the method of example 1, further including receiving data for use in executing the function.

Example 7 includes the method of example 1, wherein the web request is a hypertext protocol POST message.

Example 8 includes the method of example 1, wherein the offload indicator is a parameter in a URI QUERY of an http request.

Example 9 includes the method of example 1, wherein the webpage includes instructions directing the computing device to perform the function.

Example 10 includes the method of example 1, wherein the webpage includes instructions directing the computing device to evaluate whether to execute the function at the computing device or to request offloading of the function.

Example 11 includes the method of example 1, wherein the result is sent when a second web request is received.

Example 12 includes the method of example 1, wherein the web request includes a destination identifying a web server that is separate from the processor.

Example 13 includes the method of example 1, further including intercepting the web request that is destined for a web server.

Example 14 is an apparatus for computation offloading in a networked environment, the apparatus comprising: an offload request receiver to detect an offload indicator in a web request received from a computing device, the web request triggered by processing of a webpage at the computing device, a request extractor to determine a function identified in the web request, the function included in the webpage, a function retriever to retrieve the function from the webpage, and a result transmitter to transmit a result of execution of the function to the computing device in response to the web request.

Example 15 includes the apparatus of example 14, wherein the apparatus is a mobile edge computing server.

Example 16 includes the apparatus of example 14, wherein the web request identifies the webpage.

Example 17 includes the apparatus of example 14, further including a content datastore, wherein the function retriever is to retrieve the function from the webpage stored in the content datastore.

Example 18 includes the apparatus of example 14, further including a content handler to retrieve the webpage from a web server.

Example 19 includes the apparatus of example 14, further including a data extractor to receive data for use in executing the function.

Example 20 includes the apparatus of example 14, wherein the web request is a hypertext protocol POST message.

Example 21 includes the apparatus of example 14, wherein the offload indicator is a parameter in a URI QUERY of an http request.

Example 22 includes the apparatus of example 14, wherein the webpage includes instructions directing the computing device to perform the function.

Example 23 includes the apparatus of example 14, wherein the webpage includes instructions directing the computing device to evaluate whether to execute the function at the computing device or to request offloading of the function.

Example 24 includes the apparatus of example 14, wherein the result transmitter is to send the result when a second web request is received.

Example 25 includes the apparatus of example 14, wherein the web request includes a destination identifying a web server that is separate from the apparatus.

Example 26 includes the apparatus of example 14, wherein the offload request receiver is to intercept the web request that is destined for a web server.

Example 27 is a non-transitory machine readable storage medium comprising instructions that, when executed, cause a machine to at least: detect an offload indicator in a web request received from a computing device, the web request triggered by processing of a webpage at the computing device, determine a function identified in the web request, the function included in the webpage, retrieve the function from the webpage, and transmit a result of execution of the function to the computing device in response to the web request.

Example 28 includes the non-transitory machine readable storage medium of example 27, wherein the machine is a mobile edge computing server.

Example 29 includes the non-transitory machine readable storage medium of example 27, wherein the web request identifies the webpage.

Example 30 includes the non-transitory machine readable storage medium of example 27, wherein instructions, when executed, cause the machine to retrieve the function by retrieving the function from a storage of the machine.

Example 31 includes the non-transitory machine readable storage medium of example 27, wherein instructions, when executed, cause the machine to retrieve the function by retrieving the function via a network from a web server.

Example 32 includes the non-transitory machine readable storage medium of example 27, wherein instructions, when executed, cause the machine to receive data for use in executing the function.

Example 33 includes the non-transitory machine readable storage medium of example 27, wherein the web request is a hypertext protocol POST message.

Example 34 includes the non-transitory machine readable storage medium of example 27, wherein the offload indicator is a parameter in a URI QUERY of an http request.

Example 35 includes the non-transitory machine readable storage medium of example 27, wherein the webpage includes instructions directing the computing device to perform the function.

Example 36 includes the non-transitory machine readable storage medium of example 27, wherein the webpage includes instructions directing the computing device to evaluate whether to execute the function at the computing device or to request offloading of the function.

Example 37 includes the non-transitory machine readable storage medium of example 27, wherein the result is sent when a second web request is received.

Example 38 is a system comprising: a web server to serve a webpage, a user device to: receive the webpage, process the webpage to determine if computation offloading is to be performed, transmit a web request including a destination identifying the web server and further identifying a function, an offload server to: intercept the web request sent to the web server, retrieve the webpage from the web server, execute the function to generate a result, and transmit the result to the user device.

Example 39 includes the system of example 38, wherein the user device is further to transmit input data for use in executing the function.

Example 40 includes the system of example 39, wherein the offload server is to use the input data in executing the function.

Example 41 includes the system of example 38, wherein processing the webpage causes the user device to determine if computation offloading is to be performed based on a characteristic of the user device.

Example 42 includes the system of example 38, wherein processing the webpage causes the user device to determine if computation offloading is to be performed based on a characteristic of the offload server.

Example 43 includes the system of example 38, wherein at least one the web server and the offload server is a mobile edge computing server.

Example 44 includes the system of example 38, wherein the web request is a hypertext protocol POST message.

Example 45 includes the system of example 38, wherein the web request includes a n offload indicator in a URI QUERY of an http request.

Example 46 includes the system of example 38, wherein the webpage includes instructions directing the user device to perform the function.

Example 47 includes the system of example 38, wherein the webpage includes instructions directing the user device to evaluate whether to execute the function at the user device or to request offloading of the function.

Example 48 is an apparatus for computation offloading in a networked environment, the apparatus comprising: means for detecting an offload indicator in a web request received from a computing device, the web request triggered by processing of a webpage at the computing device, means for determining a function identified in the web request, the function included in the webpage, means for retrieving the function from the webpage, and means for transmitting a result of execution of the function to the computing device in response to the web request.

Example 49 includes the apparatus of example 48, wherein the apparatus is a mobile edge computing server.

Example 50 includes the apparatus of example 48, wherein the web request identifies the webpage.

Example 51 includes the apparatus of example 48, further including means for storing the webpage, wherein the means for retrieving the function are to retrieve the function from the webpage stored in means for storing the webpage.

Example 52 includes the apparatus of example 48, further including means for retrieving the webpage from a web server.

Example 53 includes the apparatus of example 48, further including means for receiving data for use in executing the function.

Example 54 includes the apparatus of example 48, wherein the web request is a hypertext protocol POST message.

Example 55 includes the apparatus of example 48, wherein the offload indicator is a parameter in a URI QUERY of an http request.

Example 56 includes the apparatus of example 48, wherein the webpage includes instructions directing the computing device to perform the function.

Example 57 includes the apparatus of example 48, wherein the webpage includes instructions directing the computing device to evaluate whether to execute the function at the computing device or to request offloading of the function.

Example 58 includes the apparatus of example 48, wherein means for transmitting the result are to send the result when a second web request is received.

Example 59 includes apparatus of example 48, wherein the web request includes a destination identifying a web server that is separate from the apparatus.

Example 60 includes the apparatus of example 48, wherein the means for detecting the offload indicator are to intercept the web request that is destined for a web server.

Example 61 is a method to offload computations in a networked environment, the method comprising: detecting, by executing an instruction via a processor, an offload indicator in a web request received from a computing device, the web request triggered by processing of a webpage at the computing device, determining, by executing an instruction via the processor, a function identified in the web request, the function included in the webpage, retrieving, by executing an instruction via the processor, the function from the webpage, and transmitting a result of execution of the function to the computing device in response to the web request.

Example 62 includes the method of example 61, wherein the processor is included in a mobile edge computing server.

Example 63 includes the method of one of example 61 or example 62, wherein the web request identifies the webpage.

Example 64 includes the method of one of example 61 or example 62, wherein retrieving the function includes retrieving the function from a storage of a web server that includes the processor.

Example 65 includes the method of one of example 61 or example 62, wherein retrieving the function includes retrieving the function via a network from a first web server that is separate from a second web server that includes the processor.

Example 66 includes the method of one of example 61 or example 62, further including receiving data for use in executing the function.

Example 67 includes the method of one of example 61 or example 62, wherein the web request is a hypertext protocol POST message.

Example 68 includes the method of one of example 61 or example 62, wherein the offload indicator is a parameter in a URI QUERY of an http request.

Example 69 includes the method of one of example 61 or example 62, wherein the webpage includes instructions directing the computing device to perform the function.

Example 70 includes the method of one of example 61 or example 62, wherein the webpage includes instructions directing the computing device to evaluate whether to execute the function at the computing device or to request offloading of the function.

Example 71 includes the method of one of example 61 or example 62, wherein the result is sent when a second web request is received.

Example 72 includes the method of one of example 61 or example 62, wherein the web request includes a destination identifying a web server that is separate from the processor.

Example 73 includes the method of one of example 61 or example 62, further including intercepting the web request that is destined for a web server.

Example 74 is an apparatus for computation offloading in a networked environment, the apparatus comprising: an offload request receiver to detect an offload indicator in a web request received from a computing device, the web request triggered by processing of a webpage at the computing device, a request extractor to determine a function identified in the web request, the function included in the webpage, a function retriever to retrieve the function from the webpage, and a result transmitter to transmit a result of execution of the function to the computing device in response to the web request.

Example 75 includes the apparatus of example 74, wherein the apparatus is a mobile edge computing server.

Example 76 includes the apparatus of one of example 74 or example 75, wherein the web request identifies the webpage.

Example 77 includes the apparatus of one of example 74 or example 75, further including a content datastore, wherein the function retriever is to retrieve the function from the webpage stored in the content datastore.

Example 78 includes the apparatus of one of example 74 or example 75, further including a content handler to retrieve the webpage from a web server.

Example 79 includes the apparatus of one of example 74 or example 75, further including a data extractor to receive data for use in executing the function.

Example 80 includes the apparatus of one of example 74 or example 75, wherein the web request is a hypertext protocol POST message.

Example 81 includes the apparatus of one of example 74 or example 75, wherein the offload indicator is a parameter in a URI QUERY of an http request.

Example 82 includes the apparatus of one of example 74 or example 75, wherein the webpage includes instructions directing the computing device to perform the function.

Example 83 is a method to offload computations in a computer networked environment including: processing, via an instruction executed by a processor of a computing device; a webpage received from a web server, executing, via the processor, an executable instructions associated with the webpage, determining, via the execution, that a function included in the executable instructions is to be executed, determining, via an instruction executed via the processor, that execution of the function is to be offloaded based on a characteristic of the computing device, generating, via an instruction executed by the processor, a web request identifying the webpage at the web server, inserting, via an instruction executed by the processor, an offload indicator identifying the function, transmitting, via an instruction executed by the processor, the web request, and transmitting, via an instruction executed by the processor, input data to be utilized in execution of the processor;

in response to receiving a result of the execution of the function, returning the result to the execution of the executable instructions that triggered the web request to offload the function.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to offload computations in a networked environment, the method comprising:
    intercepting, by executing an instruction via an offload processor, a web request sent to a web server by a computing device, the web request triggered by processing of a webpage at the computing device;
    detecting, by executing an instruction via the offload processor, an offload indicator in the web request received from the computing device, the offload indicator based on at least one of latency and estimated compute time between the computing device and the offload processor;
    determining, by executing an instruction via the offload processor, a function identified in the web request, the function included in the webpage;
    retrieving, by executing an instruction via the offload processor, the function from the webpage;
    executing the retrieved function, including a calculation included in the retrieved function, using the offload processor to obtain a result of the execution of the retrieved function, the web request including input data from the computing device; and
    transmitting the result of the execution of the retrieved function to the computing device in response to the web request.

2. A method as defined in claim 1, wherein the offload processor is included in a mobile edge computing server.

3. A method as defined in claim 1, wherein the web request identifies the webpage.

4. A method as defined in claim 1, wherein retrieving the function includes retrieving the function from a storage of a web server that includes the offload processor.

5. A method as defined in one of claim 1, wherein retrieving the function includes retrieving the function via a network from a first web server that is separate from a second web server that includes the offload processor.

6. A method as defined in one of claim 1, further including receiving data for use in executing the function.

7. A method as defined in one of claim 1, wherein the web request is a hypertext protocol POST message.

8. A method as defined in one of claim 1, wherein the offload indicator is a parameter in a URI QUERY of an http request.

9. A method as defined in one of claim 1, wherein the webpage includes instructions directing the computing device to perform the function.

10. A method as defined in one of claim 1, wherein the webpage includes instructions directing the computing device to evaluate whether to execute the function at the computing device or to request offloading of the function.

11. A method as defined in one of claim 1, wherein the result of the execution of the retrieved function is sent when a second web request is received.

12. A method as defined in one of claim 1, wherein the web request includes a destination identifying a web server that is separate from the offload processor.

13. A method as defined in one of claim 1, further including intercepting the web request that is destined for a web server.

14. An apparatus for computation offloading in a networked environment, the apparatus comprising:
    memory for storing instructions;
    at least one processor to execute the instructions to at least:
    intercept a web request sent to a web server by a computing device, the web request triggered by processing of a webpage at the computing device;
    detect an offload indicator in the web request received from the computing device, the offload indicator based on at least one of latency and estimated compute time between the computing device and the apparatus;
    determine a function identified in the web request, the function included in the webpage;
    retrieve the function from the webpage;
    execute the retrieved function, including a calculation included in the retrieved function;
    obtain a result of the execution of the retrieved function, the web request including input data from the computing device; and
    transmit a result of the execution of the retrieved function to the computing device in response to the web request.

15. An apparatus as defined in claim 14, wherein the apparatus is a mobile edge computing server.

16. An apparatus as defined in one of claim 14, wherein the web request identifies the webpage.

17. An apparatus as defined in one of claim 14, further including a content datastore, wherein the processor is to retrieve the function from the webpage stored in the content datastore.

18. An apparatus as defined in one of claim 14, further including a content handler to retrieve the webpage from a web server.

19. An apparatus as defined in one of claim 14, further including a data extractor to receive data for use in executing the function.

20. An apparatus as defined in one of claim 14, wherein the web request is a hypertext protocol POST message.

21. An apparatus as defined in one of claim 14, wherein the offload indicator is a parameter in a URI QUERY of an http request.

22. A non-transitory machine readable storage medium comprising instructions that, when executed, cause a machine to at least:
    intercept a web request sent to a web server by a computing device, the web request triggered by processing of a webpage at the computing device;
    detect an offload indicator in a web request received from the computing device, the offload indicator based on at least one of latency and estimated compute time between the computing device and the machine;
    determine a function identified in the web request, the function included in the webpage;
    retrieve the function from the webpage;
    execute the retrieved function, including a calculation included in the retrieved function;
    obtain a result of the execution of the retrieved function, the web request including input data from the computing device; and
    transmit a result of the execution of the retrieved function to the computing device in response to the web request.

23. A non-transitory machine readable storage medium as defined in claim 22, wherein the web request is a hypertext protocol POST message.

24. A non-transitory machine readable storage medium as defined in one of claim 22, wherein the web request identifies the webpage.

25. A non-transitory machine readable storage medium as defined in one of claim 22, wherein instructions, when executed, cause the machine to retrieve the function from a storage of a web server implemented on the machine.

* * * * *